United States Patent [19]

Shtarkman

[11] Patent Number: 4,577,842
[45] Date of Patent: Mar. 25, 1986

[54] SELF-STABILIZING DRY VISCOUS SPRING DAMPER

[75] Inventor: Emile M. Shtarkman, Cleveland, Ohio

[73] Assignee: Imperial Clevite Inc., Glenview, Ill.

[21] Appl. No.: 611,489

[22] Filed: May 17, 1984

Related U.S. Application Data

[63] Continuation-in-part of Ser. No. 554,906, Nov. 25, 1983, Pat. No. 4,555,098.

[51] Int. Cl.⁴ .............................................. F16F 5/00
[52] U.S. Cl. ................................... 267/140.1; 267/35; 267/141.6
[58] Field of Search ............ 267/8 R, 22 R, 35, 63 A, 267/64.19, 64.21, 64.23, 64.24, 140.1, 140.5, 141.6

[56] References Cited

U.S. PATENT DOCUMENTS

| | | | |
|---|---|---|---|
| 13,248 | 7/1855 | Heyward | 267/64.27 X |
| 871,186 | 11/1907 | Rosenzweig . | |
| 971,583 | 10/1910 | Bell | 267/64.24 |
| 1,038,636 | 9/1912 | Oxnard | 267/64.24 |
| 1,886,712 | 11/1932 | Messier . | |
| 2,460,116 | 1/1949 | Bazley . | |
| 3,121,479 | 2/1964 | Dillenburger et al. . | |
| 3,130,965 | 4/1964 | Niclas . | |
| 3,160,407 | 12/1964 | Vaugoyeaux . | |
| 3,285,596 | 11/1966 | Burgett | 267/64.23 |
| 3,380,557 | 4/1968 | Peterson . | |
| 3,424,448 | 1/1969 | Chak Ma . | |
| 3,658,314 | 4/1972 | Luzsicza | 267/121 |
| 3,687,440 | 8/1972 | Jarret et al. | 267/141 |
| 3,897,856 | 8/1975 | Pineau . | |
| 4,005,858 | 2/1977 | Lochner | 267/136 |
| 4,011,929 | 3/1977 | Jeram et al. | 188/268 |
| 4,052,088 | 10/1977 | Nicholls | 280/708 |
| 4,234,172 | 11/1980 | Takahashi | 267/8 R |
| 4,352,487 | 10/1982 | Shtarkman | 267/35 |
| 4,401,298 | 8/1983 | Eaton et al. | 267/140.1 |

FOREIGN PATENT DOCUMENTS

| | | |
|---|---|---|
| 217855 | 2/1957 | Australia ......................... 267/64.24 |
| 446532 | 2/1948 | Canada . |
| 137271 | 8/1979 | German Democratic Rep. . |
| 760 | of 1898 | United Kingdom . |
| 1152526 | 5/1969 | United Kingdom . |
| 2004349 | 3/1979 | United Kingdom . |
| 1543340 | 4/1979 | United Kingdom . |
| 1601444 | 10/1981 | United Kingdom . |

Primary Examiner—Duane A. Reger
Attorney, Agent, or Firm—Russell E. Baumann

[57] ABSTRACT

A self-stabilizing dry viscous spring damper is provided for absorbing shock that is particularly resistant to instability due to nonaxial deformation. The damper comprises opposed first and second outer housing members which are elastomerically associated with a shear spring. A selectively pressurizable gas chamber is provided having a subchamber disposed in association therewith which includes, preferably, a plurality of elastomeric particles. A rigid structural assembly with deformable bushing and metal bearing members is included in the damper for stabilizing the device upon relative compressive movement of the first and second outer housing members. That is, the deformable bushing is provided to allow controlled nonaxial deformation to a maximum predetermined limit. Past this maximum deformation limit nonaxial forces are entirely carried by the rigid assembly. An inner housing is provided which includes outer wall portions configured in an arcuate bell-like configuration to engage the deformable elastomeric shear springs upon compression of the damper. The form of the inner housing wall portions allows engagement of the shear springs in a nonfrictional manner.

7 Claims, 5 Drawing Figures

FIG. I

SELF-STABILIZING DRY VISCOUS SPRING DAMPER

BACKGROUND OF THE INVENTION

This application is a continuation-in-part of U.S. Ser. No. 06/554,906 filed November 25, 1983 now Pat. No. 4,555,698.

The present invention relates generally to load carrying devices. More particularly, it relates to shock absorbing devices of the type which are mounted to vehicles and which use both an elastomeric spring and a selectively pressurizable chamber for absorbing shock, energy dissipation and carrying or leveling load. However, it will be appreciated by those skilled in the art that the invention can be readily adapted for use in other environments as, for example, where similar spring damping devices are employed to protect or cushion other items.

Known dry viscous spring damper devices of the type described have included elastomeric shear springs, elastomeric diaphragms, selectively pressurizable gas chambers and subchambers including elastomeric composite particles or fluid. Such a dry viscous spring damper device is described in application Ser. No. 436,331, filed October 25, 1982 in the name of Shtarkman and assigned to the assignee of the subject application. In the Shtarkman application, a dry viscous spring damper is provided which is comprised of a first housing member joined to a second housing member with an elastomeric shear spring. A first chamber in the damper is separated from a second chamber in the damper by an elastomeric diaphragm. A valve is provided for selectively pressurizing the second chamber with pressurized gas or air. A plurality of elastomeric particles are included in the first chamber whereby relative movement between the housing members operates to stress the shear spring and the elastomeric particles and vary the volumes of the first and second chambers.

A particular problem with viscous spring dampers is the lack of effective control over the form of deformation of the elastomeric springs of such devices. It is important that the damper be able to absorb shock and dissipate energy from forces directed at the damper from a variety of directions; however, such dampers may respond differently to forces directed from different directions. It is an important and desirable operating feature of such a damper to have the damper respond to such a variety of forces in a stable or predictable manner. Known prior spring dampers have suffered the problems of responsive instability due to nonaxial vibration, loading and deformation. Such nonaxial deformation may comprise conical twisting or rotation of the respective housing members to a different degree about the axis of the damper. Such instability is particularly enhanced where the damper is loaded to a substantially compressed state which imparts a high shear force to the elastomeric shear springs.

Another particular problem occurs where shear stress compels a spring into frictional engagement with a contiguous rigid member. The resulting friction wears away the spring to shorten its life and weaken it. In addition, such frictional engagement limits the natural deformation of the spring and affects its operation.

The present invention comprises a new and improved device which overcomes the energy absorption and frictional problems of prior dry viscous spring dampers by combining the advantageous features of a dry viscous spring damper with structural means for generally controlling deformation of the device in a nonaxial direction within predetermined limits and by providing surfaces contiguous to the shear springs to allow minimal abrasion between the shear spring and surfaces during deformation of the device. The subject invention is simple in design, economical to manufacture, readily adaptable to a plurality of energy dissipation uses, and provides improved shock absorption and energy dissipation.

BRIEF SUMMARY OF THE INVENTION

In accordance with the present invention there is provided a self-stabilizing dry viscous spring damper for damping and leveling structural agitation comprising a first outer housing and a second outer housing. An elastomeric shear spring associates the first outer housing with the second outer housing. A selectively pressurizable gas chamber is included within the damper and a subchamber is provided within the gas chamber. A rigid structural means is disposed in a bearing portion held with a rubber bushing in the device to control nonaxial deformation of the damper.

In accordance with another aspect of the present invention, the structural means comprises a rod and tubing fixedly attached to the first and second outer housings respectively and an inner housing. Elastomeric shear springs associate the first and second outer housings within the inner housing. A plurality of selectively pressurizable gas chambers are included within the damper with at least one subchamber provided in one of said chambers being filled with a plurality of elastomeric particles. Associated within the inner housing are bearing portions sized for close reception of the rod and tube and elastomeric bushings for mounting the bearings to the inner housing and for controlling nonaxial deformation of the device.

It is a principle object of the present invention to provide an improved self-stabilizing dry viscous spring damper having improved operating characteristics.

It is another object of the invention to provide a dry viscous spring damper having a load supporting and energy dissipating capability.

It is still another object of the invention to provide a dry viscous spring damper having the feature of providing for constant pressure in operation.

It is yet another object of the invention to provide a dry viscous spring damper having a rigid structural member for limiting nonaxial deformation of the damper.

Other objects and advantages for the subject new dry viscous spring damper will become apparent to those skilled in the art upon a reading and understanding of the specification.

BRIEF DESCRIPTION OF THE DRAWINGS

The invention may take physical form in certain parts and arrangements of parts, the preferred embodiments of which will be described in detail in the specification and illustrated in the accompanying drawings which form a part hereof and wherein.

DETAILED DESCRIPTION OF THE INVENTION

Figure 1:
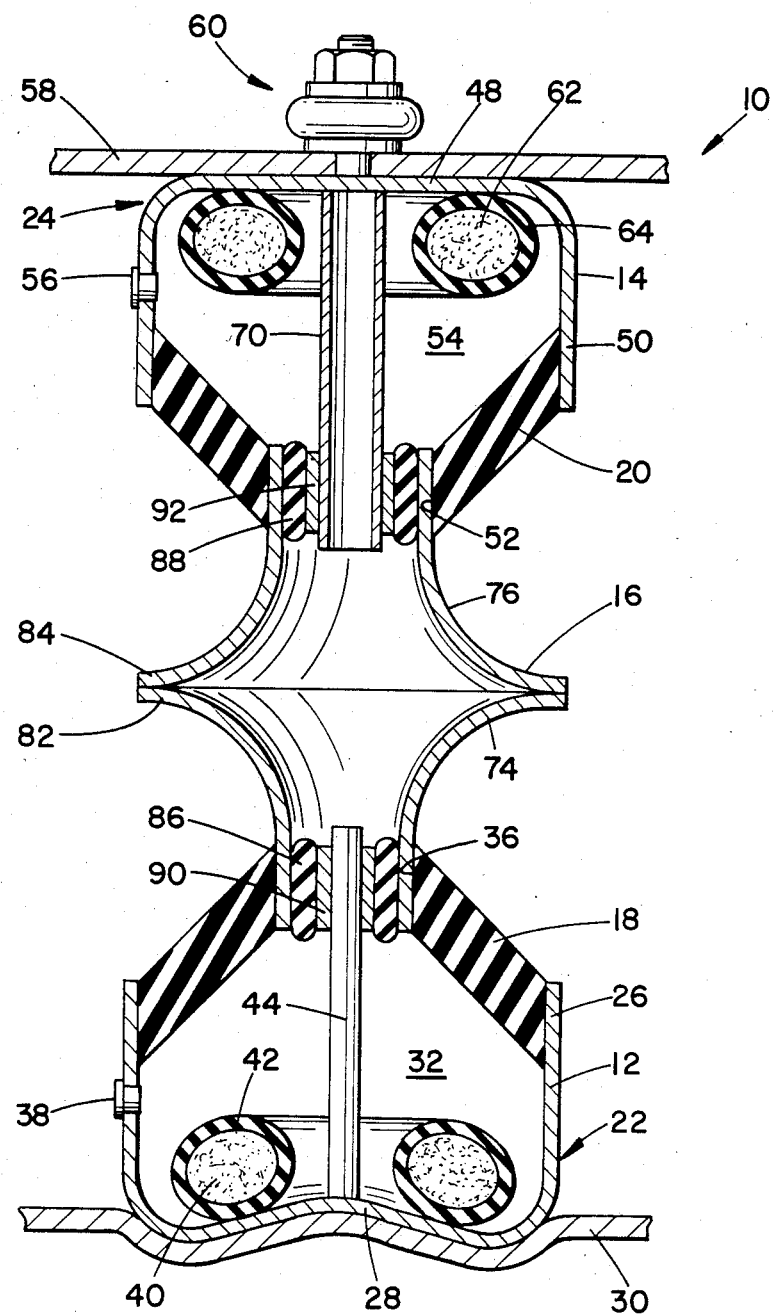
FIG. 1 is a cross-sectional, elevational view of a self-stabilizing dry viscous spring damper constructed in accordance with the present invention and shown in a free state.
Figure 2:
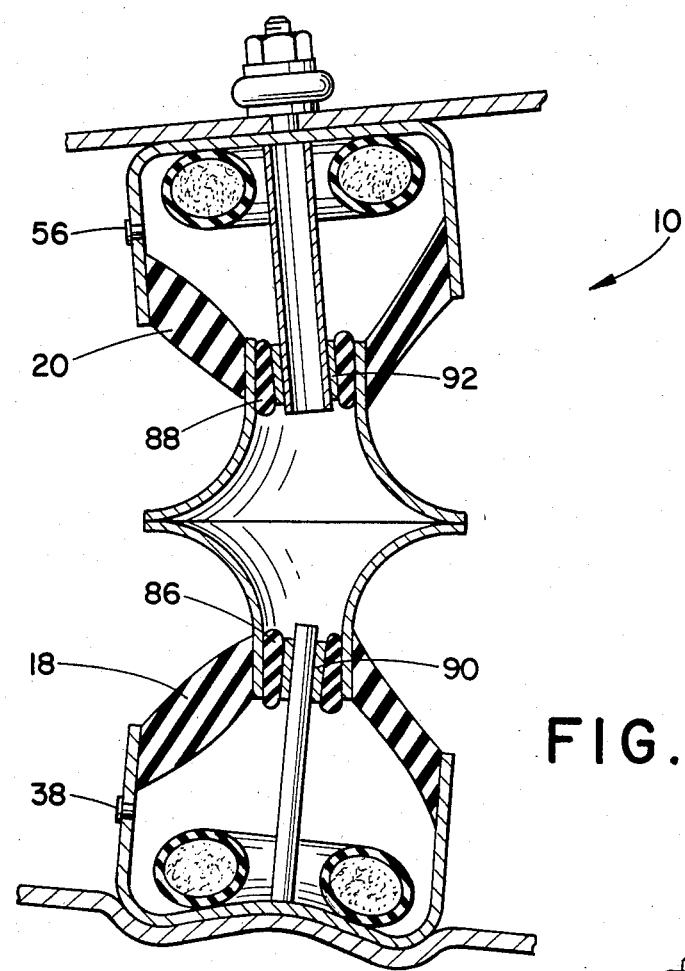
FIG. 2 is a cross-sectional, elevational view showing the spring damper of FIG. 1 in a state of nonaxial deformation.
Figure 3:
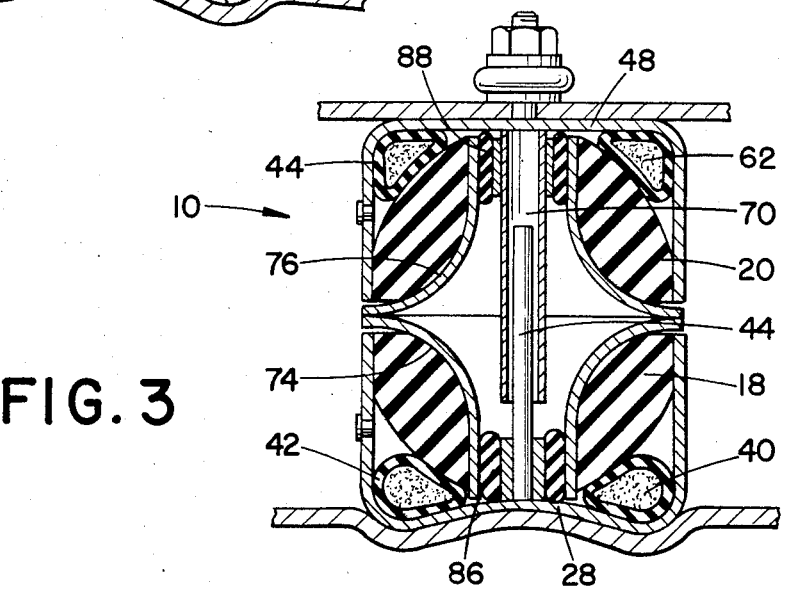
FIG. 3 is a cross-sectional, elevational view of the spring damper of FIG. 1 in a compressed state.

Referring now to the drawings wherein the showings are for purposes of illustrating the invention only and not for purposes of limiting the same, FIGS. 1-3 show a preferred self-stabilizing dry viscous spring damper 10 for damping and leveling structural agitation. The damper 10 is comprised of a first outer housing 12 and a second outer housing 14. An inner housing 16 is disposed intermediate of the first and second outer housings. A first elastomeric shear spring 18 associates the first outer housing with the inner housing 16 and therethrough the second outer housing 14. A second elastomeric shear spring 20 associates the second outer housing 14 with the inner housing 16 and therethrough the first outer housing 12.

First outer housing 12 has a casing 22 which is preferably configured in a cuplike form to include a side wall 26 generally normally depending from a base wall 28. The casing is constructed of a rigid, preferably metallic material. The first outer housing 12 is supported on a first support base 30 which is joined or bonded to the housing at the base wall 28. Although the base wall 28, and the first support base 30 are illustrated as having arcuate configurations, it is within the scope of the invention to include any type of mating configurations, including simply planar configurations.

Opposite of the base wall 28, the first elastomeric shear spring 18 is bonded or joined to the terminal end portion of the side wall 26 to define a pressurizable gas chamber 32 intermediate the shear spring and the base wall. The shear spring 18 is conformed in a generally obtuse cuplike configuration whose radially outermost end is bonded to the side wall 26. The spring includes a centrally disposed port 36 for receiving and bonding to a portion of the inner housing 16. The chamber 32 is selectively pressurizable through a valve 38.

Included in the first chamber 32 is a first subchamber 40 defined by an annular elastomeric tubing 42. The tubing preferably includes a plurality of elastomeric particles within the chamber 40. Also included in the first chamber 32 is a rigid structural member preferably comprising a rod 44 which extends from the base wall 28 towards the second outer housing 14 along the axis of the damper 10. Rod 44 extends at least partially within the inner housing 16.

The second outer housing 14 is similarly configured to the first housing 12 and includes a housing casing 24 including a base wall 48 and a side wall 50 generally normally depending therefrom.

The second elastomeric shear spring 20 is joined to the side wall 50 at its radially outermost end and is joined to the inner housing 16 at a centrally disposed spring port 52. Intermediate of the spring 20 and the base wall 48 is a selectively pressurizable gas chamber 54 which may be pressurized through valve 56. The outer housing 14 is supported at a second support base 58 and may either be bonded or fastened to the support base 58 such as by conventional fastening means 60.

Included in the pressurizable chamber 54 of the second outer housing 14 is a subchamber 62 defined within an annular elastomeric tubing 64 and which preferably includes a plurality of elastomeric particles. The tubing 64 is preferably bonded to the base wall 48.

Also included in this second chamber is a second rigid structural member preferably comprising a tube 70 that extends from the base wall 48 towards the first outer housing 12 along the axis of the damper 10. The tube 70 extends through the gas chamber 54 into at least a portion of the inner housing 16.

The inner housing 16 includes a first wall portion 74 contiguous to the first outer housing 12 and a second wall portion 76 contiguous to the second outer housing 14. The inner housing wall portions are configured to have an arcuate bell-like form for nonfrictional engagement to the shear springs 18, 20 upon compression of the damper 10. The wall portions include cylindrical axially first outermost end portions which are bonded to the shear springs 18, 20 that depend into the radially second outermost ends 82, 84 which are joined and sealed together. A first elastomeric bushing 86 is bonded to inner housing 16 contiguous to the first outer housing 12, and a second elastomeric bushing 88 is bonded to the inner housing contiguous to the second outer housing 14. Rod bearing 90 is bonded to the first bushing 86 and bears axial movement of the rod 44 relative to the bushing 86 and inner housing 16. Tube bearing 92 is bonded to the second bushing 88 and bears axial movement of the tube 70 relative to the bushing 88 and inner housing 16. Bearings 90 and 92 preferably are self-lubricating metal bearings as are known in the art. Rod and tube members along with the inner housing provide a rigid structure for the device in which bushings 86 and 88 operate to allow a controlled predetermined limit of non-axial deflection of the first and second outer housings relative to each other, as will hereinafter be more fully explained.

With particular reference to FIG. 2, a damper 10 constructed in accordance with the present invention is illustrated in a state of nonaxial deformation caused from conical twisting of the damper. Such deformation may typically occur when the damper of the invention is installed as a support in a conventionally configured automobile wheel frame. In FIG. 2 the first elastomeric spring 18 and first bushing 86 are deformed such that the radial portions of the spring 18 and bushing 86 near the valve 38 are compressed and the opposite portions of the spring and bushing are stretched. Likewise, the second elastomeric shear spring 20 and second bushing 88 have portions adjacent the valve 56 which are compressed and opposite portions of which are stretched. When the elastomeric shear springs 18, 20 and bushings 86, 88 efficiently bear the nonaxial forces producing the type of deformation illustrated in FIG. 2, the operation of the damper 10 with respect to axial forces is not substantially affected. However, when the deformation would normally stress the springs and bushings to materially affect efficient operation, the device of the instant invention overcomes this problem by providing interaction between inner housing 16, the rod 44 and the tube 70 to control conical or nonaxial movement in a predetermined manner. This control is achieved by the selective use of rubber bushings 86 and 88. That is, when the axial deformation is relatively minor nonaxial deformation is controlled to a maximum predetermined limit by the elastomeric deformation of the bushings 86, 88. However, when the axial deformation is greater than that limit, nonaxial deformation is borne by the inner housing, rod and tube members.

With particular reference to FIG. 3, the damper 10 is substantially fully compressed. It may be seen that the tube 70 has received the rod 44 in such a manner to provide for maximum axial deflection of the device. The shear springs 18, 20 are only bearing the axial forces which have compressed the damper 10 to the state illustrated and it is the bushings 86 and 88 which bear to a predetermined limit any nonaxial forces.

With continued reference to FIG. 3 it may be seen that the elastomeric springs 18, 20 have been deformed to abut both the side wall portions 74, 76 of the inner housing and also stress and compress the inner tubings 42, 44 and subchambers 40, 62. The wall portions 74, 76 of the inner housing are configured such that upon compression of the damper 10, the springs 18, 20 will engage the wall portions 74, 76 with minimal frictional engagement thereto. The arcuate, bell-like configuration of the walls conforms to the springs as they deform and precludes slipping actions that would normally wear away the springs to affect damper operation and limit its useful life.

Figure 4:
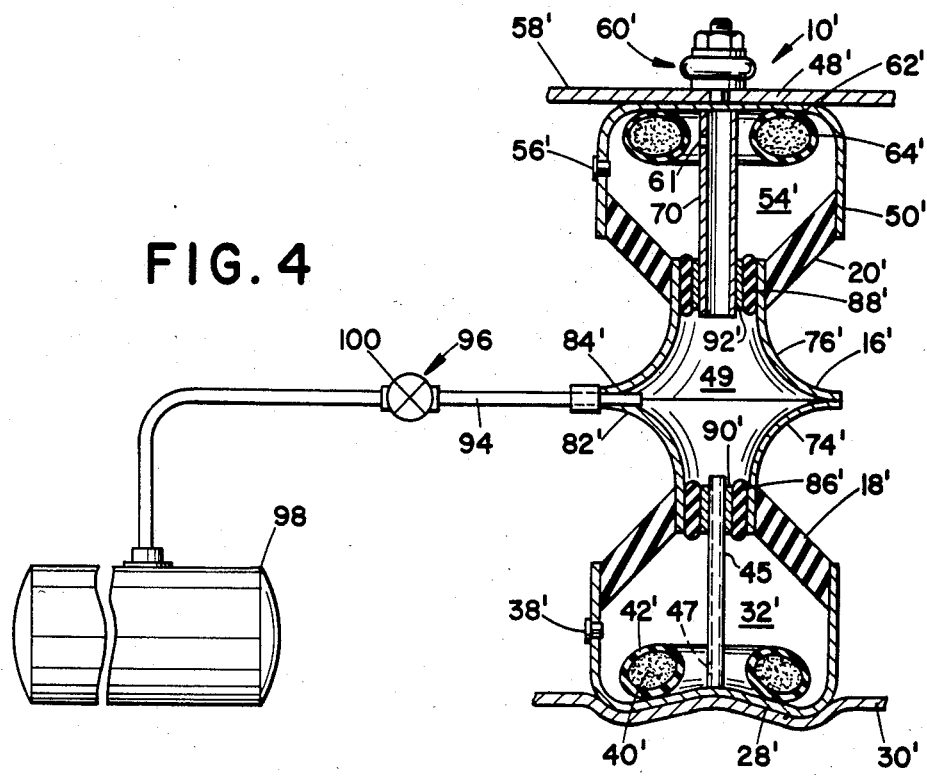
FIG. 4 is a cross-sectional, elevational view of an alternative embodiment of a self-stabilizing dry viscous spring damper with constant pressure means constructed in accordance with the present invention and shown in a free state.
Figure 5:
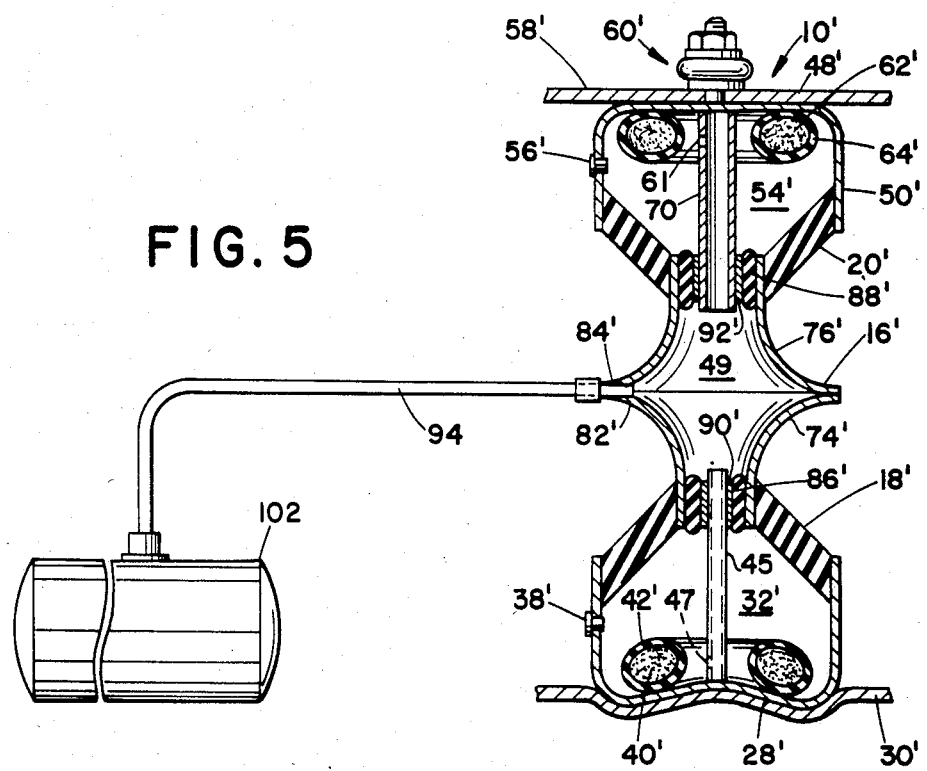
FIG. 5 is a cross-sectional, elevational view of yet another alternative embodiment of a self-stabilizing dry viscous spring damper with constant pressure means constructed in accordance with the present invention and shown in a free state.

With particular reference to FIGS. 4 and 5, alternative embodiments of the invention are illustrated. For ease of illustration and appreciation of these alternatives, like components are identified by like numerals with primal (') suffixes and new components are identified by new numerals. Self-stabilizing dry viscous spring damper 10' is generally identical to damper 10 shown in FIG. 1, including first outer housing 12', second outer housing 14', inner housing 16', first elastomeric shear spring 18' and second elastomeric shear spring 20'.

First outer housing 12' has a casing 22' which is preferably configured in a cuplike form to include a side wall 26' generally normally depending from a base wall 28'. The first outer housing 12' is supported on a first support base 30' which is joined or bonded to the housing at the base wall 28'.

Opposite of the base wall 28', the first elastomeric shear spring 18' is bonded or joined to the terminal end portion of the side wall 26' to define a pressurizable gas chamber 32' intermediate the shear spring and the base wall. The shear spring 18' is conformed in a generally obtuse cuplike configuration whose radially outermost end is bonded to the side wall 26'. The spring includes a centrally disposed port 36' for receiving and bonding to a portion of the inner housing 16'. The chamber 32' is selectively pressurizable through a valve 38'.

Included in the first chamber 32' is a first subchamber 40' defined by an annular elastomeric tubing 42'. The tubing preferably includes a plurality of elastomeric particles within the chamber 40'. Also included in the first chamber 32' is a rigid structural member preferably comprising a hollow rod 45 which extends from the base wall 28' towards the second outer housing 14' along the axis of the damper 10'. Rod 45 extends at least partially within the inner housing 16'. Adjacent the end of rod 45 in contact with wall 28' is an opening 47 which provides communication between chamber 32' and a central chamber 49 through hollow rod 45.

The second outer housing 14' is similarly configured to the first housing 12' and includes a housing casing 24' including a base wall 48' and a side wall 50' generally normally depending therefrom.

The second elastomeric shear spring 20' is joined to the side wall 50' at its radially outermost end and is joined to the inner housing 16' at a centrally disposed spring port 52'. Intermediate of the spring 20' and the base wall 48' is a selectively pressurizable gas chamber 54' which may be pressurized through valve 56'. The outer housing 14' is supported at a second support base 58' and may either be bonded or fastened to the support base 58' such as by conventional fastening means 60'.

Included in the pressurizable chamber 54' of the second outer housing 14' is a subchamber 62' defined within an annular elastomeric tubing 64' and which preferably includes a plurality of elastomeric particles. The tubing 64' is preferably bonded to the base wall 48'.

Also included in this second chamber is a second rigid structural member preferably comprising a tube 71 that extends from the base wall 48' towards the first outer housing 12' along the axis of the damper 10'. The tube 71 extends through the gas chamber 54' into at least a portion of the inner housing 16' and central chamber 49. Adjacent the end of tube 71 in contact with base wall 48' is an opening 61 which provides communication between chamber 54' and central chamber 49 through tube 71.

The inner housing 16' includes a first wall portion 74' contiguous to the first outer housing 12' and a second wall portion 76' contiguous to the second outer housing 14'. The inner housing wall portions are configured to have an arcuate bell-like form for nonfrictional engagement to the shear springs 18', 20' upon compression of the damper 10'. The wall portions include cylindrical axially first outermost end portions which are bonded to the shear springs 18', 20' that depend into the radially second outermost ends 82', 84' which are joined and sealed together to tube member 94 to be discussed in further detail below. A first elastomeric bushing 86' is bonded to inner housing 16' contiguous to the first outer housing 12', and a second elastomeric bushing 88' is bonded to the inner housing contiguous to the second outer housing 14'. Rod bearing 90' is bonded to the first bushing 86' and bears axial movement of the rod 45 relative to the bushing 86' and inner housing 16'. Tube bearing 92' is bonded to the second bushing 88' and bears axial movement of the tube 70' relative to the bushing 88' and inner housing 16'. Bearings 90' and 92' preferably are self-lubricating metal bearings as are known in the art. Rod and tube members along with the inner housing provide a rigid structure for the device in which bushings 86' and 88' operate to allow a controlled predetermined limit of nonaxial deflection of the first and second outer housings relative to each other.

As will hereinafter be more fully explained a constant pressure means 96 is provided. Pressure means 96 in one embodiment (FIG. 4) includes tubing 94 for providing communication between damper 10' and a pressurized gas source 98. This pressurized gas source preferably is a compressor type unit although a large reservoir of pressurized gas or other means may equally well be used. Conveniently this pressurized gas source can be located in the trunk compartment of the motor vehicle using damper 10'. A constant pressure valve 100 of the type known in the art is placed intermediate gas source 98 and damper 10'. This valve provides for maintaining a relatively constant pressure in damper 10' in line with its initial setting for a given load value. That is, if the pressure drops in the chambers 32', 54' and 49 of damper 10' the valve will allow the gas source to bring them to the preset pressure of the valve and conversely if the pressure rises the valve will provide the venting of the damper to atmosphere until the preset pressure of the value is reached.

In operation constant pressure means 96 maintains relatively constant pressure in chambers 32', 54' and 49 of damper 10' whether the device is in a free state (FIG. 1) or in a compressed state (FIG. 3). This feature provides a damper 10' with a much more constant spring rate through the total operational stroke of the device. This feature also provides for varying load carrying capacity of the device in response to change in load without appreciably varying spring rate. This is done by changing the pressure setting of valve 100.

Still another means of achieving nearly the same desired result (FIG. 5), is to provide a constant pressure means 96 without valve 100 and which incorporates a large gas reservoir 102 (e.g. the reservoir's volume is greater than combined volumes of chambers 32', 54' and 49) in place of pressurized gas source 98 directly in fluid communication with damper 10'. Preferably the volume of reservoir 102 is at least twice as great as the combined volumes of the chambers. This reservoir would be directly connected to the damper 10' and due to its volume being greater than that of the three chambers, the total volume of reservoir/damper system changes little whether the damper is in a free state (FIG. 1) or in a compressed state (FIG. 3), hence pressure remains relatively constant through the total operational stroke of the damper. Of course, as required pressure within the reservoir/damper system may be calibrated to carry the desired loads. Similarly other means as known in the art for achieving constant pressure or predetermined pressure/stroke characteristics can be implemented in the damper system.

The damper of the present invention is particularly useful as a device which advantageously accepts and bears nonaxial forces. The elastomeric bushings 86, 88 stabilize the load on the damper. Such a construction allows for flexibility while still providing for the stability that is needed to maintain predictable and effective operation of the damper and to provide a damper having a relatively long useful life.

The invention has been described with reference to the preferred embodiment. Obviously, modifications and alterations will occur to others upon the reading and understanding of the specification. It is our intention to include all such modifications and alterations insofar as they come within the scope of the appended claims or the equivalents thereof.

We claim:
1. A viscous spring damper for damping and leveling structural agitation which is resistant to nonaxial deformation comprising:
   a first outer housing and a second outer housing;
   an elastomeric shear spring associating said first outer housing with said second outer housing;
   a selectively pressurizable gas chamber and a subchamber within said gas chamber contained within at least one of said first and second housing and constant pressure means in fluid communication with selectively pressurizable gas chamber; and
   a rigid structural member in which one end is mounted in one of said housings and said other end is received in a bearing which is mounted to the other housing by an elastomeric bushing whereby said bushing and said structural member allow and control nonaxial deformation within said damper.

2. The damper of claim 1 wherein said constant pressure means includes a pressurized gas source and a constant pressure valve.

3. The damper of claim 1 wherein said constant pressure means includes a reservoir having a volume greater than that of said pressurizable gas chamber.

4. A dry viscous spring damper for damping and leveling structural agitation which is resistant to nonaxial deformation comprising:
   a first outer housing and a second outer housing;
   an inner housing intermediate of said first and said second outer housings, said inner housing communicating with a plurality of elastomeric shear springs for associating said inner housing with said first and second outer housings;
   a selectively pressurizable gas chamber in at least one of said first and second outer housings and a subchamber within at least one of said gas chambers and a constant pressure means in fluid communication with said pressurizable gas chamber; and
   a rigid structural member in which one end is mounted in one of said housings and said other end is received in a bearing which is mounted to the other housing by an elastomeric bushing whereby said bushing and said structural member controls nonaxial deformation of said damper.

5. The damper of claim 4 wherein there are first and second pressurizable gas chambers with said first and second outer housings and additionally a central chamber and said constant pressure means is in fluid communication with all of said chambers.

6. The damper of claim 5 wherein said constant pressure means includes a pressurized gas source and a constant pressure valve.

7. The damper of claim 5 wherein said constant pressure means includes a reservoir having a volume greater than that of all of said chambers.

* * * * *